Figure 1:
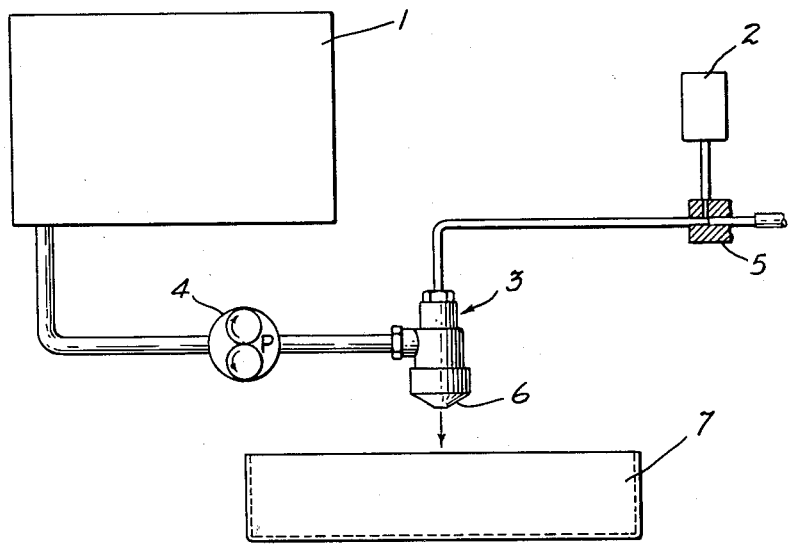

Sept. 15, 1964      G. T. GMITTER      3,149,083
CELLULAR POLYETHERURETHANES AND METHODS OF MAKING SAME
Filed April 28, 1961

INVENTOR
*George T. Gmitter*

BY McCoy, Greene + de Grotenhuis
ATTORNEYS

United States Patent Office 3,149,083
Patented Sept. 15, 1964

3,149,083
CELLULAR POLYETHERURETHANES AND
METHODS OF MAKING SAME
George T. Gmitter, Fairlawn Village, Ohio, assignor to
The General Tire & Rubber Company, Akron, Ohio, a
corporation of Ohio
Filed Apr. 28, 1961, Ser. No. 106,262
17 Claims. (Cl. 260—2.5)

The present invention relates to improvements in the manufacture of polyurethane prepolymers and other articles and more particularly to block polymers and methods of making same, polyether urethane prepolymers, improved elastomeric polyether urethane foams, methods of making prepolymers, and "one-shot" and "prepolymer" methods of making polyurethane articles.

One aspect of the invention relates to an improved process for the preparation of rubbery polyurethane foamed products from the reaction between polyalkylene ether glycols and organic polyisocyanates. In the past, polyester-diisocyanate foams have been made by reacting a non-linear slightly branched polyester with a diisocyanate and a small amount of water or by reacting a linear polyester with a mixture of di- and tri-isocyanates and water. An excess of diisocyanate over that needed to react with the polyester to form the polyurethane was used to react with the water and produce carbon dioxide for forming the cells in the solid product. The water is also a dispersing medium for an "activator" mixture which generally, also, included a catalyst for the polyurethane reaction.

The diisocyanate, therefore, was added to build up the polyester to a high molecular weight, and to crosslink the polyester sufficiently, and to provide carbon dioxide. Linear polymers alone did not generally change from the liquid state to the solid state quickly enough to trap the $CO_2$ gases evolved and thereby form a desirable foamed product.

Polyethers have advantages over polyesters in their resistance to hydrolysis and in their resilient properties. Polyethers have also been proposed to replace polyesters in forming the spongy materials. However, when an attempt was made to substitute polyethers for polyesters in making foam, prior to this invention, the proper cell structure for useable foam was not obtained; much of the carbon dioxide was lost and not entrapped even though many variations in polyethers were made.

I have found that a polyurethane foam material having improved properties of resilience, resistance to hydrolysis, uniform density, and uniform pore size may be prepared from polyalkylene ether glycol or other hydroxyl-containing polyether starting materials having even very low viscosity by properly reacting a polyether with a polyisocyanate to form flowable, preferably viscous, partially reacted prepolymer preferably having isocyanato end groups and thereafter reacting the prepolymer with water and a suitable reaction catalyst in the presence of a silicone oil and in the presence of some agitation so as to entrap the carbon dioxide. The foam should be wrung to rupture the cell walls as, for example, by passing the foam several times between squeeze rolls or the like.

I have found that it is difficult to form a high quality elastomeric foam unless some trifunctional material is employed to properly entrap the carbon dioxide. The necessary trifunctional material may be provided by employing a polyether triol or a small amount of a simple polyol for reaction with the polyisocyanate. If all of the polyethers are bifunctional materials, such as polyalkylene ether glycols, crosslinking agents of the type hereinafter described are preferably employed in order to obtain high quality elastomeric ("flexible") foams. A cross-linking agent, such as trimethylol propane or the like, may be mixed with the polyether glycols prior to reaction with the diisocyanate, but at least part of the cross-linking agent is usually employed in the activator mixture that is reacted with the prepolymer to form the foam.

It is an object of this invention to provide a method for efficiently producing polyurethane foam from polyether starting material.

It is another object of the present invention to provide a method of preparing foamed elastic polyurethanes with unusual resistance to hydrolysis as evidenced by improved resiliency and improved humidity aging properties.

It is an object to provide a method of producing polyetherurethane foams with a fine, uniform pore size.

It is another object of the present invention to provide foamed polyether urethane and method of preparing the same which has improved properties such as hydrolytic stability, resiliency, compression-deflection curves, and a lower compression set value.

It is a further object of the present invention to produce a polyalkylene ether glycol-polyisocyanate prepolymer with a relatively high molecular weight and a more uniform molecular weight for subsequent conversion into improved polyurethane foams.

Figure 2:
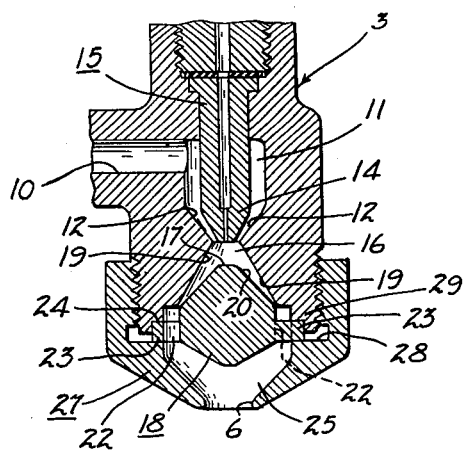

These and other objects will be apparent from the following description and appended claims and drawing in which:

FIGURE 1 is fragmentary diagrammatic sketch of an apparatus for mixing a polyether-polyisocyanate prepolymer and activator mixture in accordance with the process of the present invention; and FIGURE 2 is fragmentary sectional view of a mixing nozzle suitable for use in the present invention and drawn on an enlarged scale.

PART I

Improved polyurethane foamed products may be obtained by the intermediate formation of a "pre-polymer" formed so as to contain some NCO end groups and probably some unreacted diisocyanate as well. The moisture-free liquid prepolymer mixture containing some free isocyanato groups may be reacted with water and a suitable crosslinking agent in the presence of a suitable catalyst to form an elastomeric polyurethane foam. Substantial quantities of one or more silicone oils should also be employed as disclosed in more detail in my copending application Serial No. 707,351, filed January 6, 1958.

The polyether glycols or other hydroxyl-terminated polyethers used as raw materials in the present invention may, if reasonably dry, be used as ordinarily received but are preferably pretreated by heating to about 100° C. under a vacuum to eliminate any substantial amounts of water. The polyether glycol, which must have a molecular weight above 750 to provide elastomeric foams and preferably has a much higher molecular weight, may be dried by any suitable means if the water content is substantial.

Inasmuch as the process of the present invention involves a series of complicated physical changes and chemical reactions, I have found it highly important to employ a partially reacted prepolymer and to bring this prepolymer into contact with an activator mixture in an enclosed mixing chamber or zone with or without using pressures substantially above the back pressure of the chamber to thereby effect quick and uniform mixing of the prepolymer and activator mixture. Excellent results are obtained by using a prepolymer instead of bringing a polyether glycol and diisocyanate together by means of different streams in the mixing zone. Apparently, a part of the excellent results is attributable to simplification of foaming chemistry since most of the chain extension of the prepolymer is already completed, and only the $CO_2$ evolution and crosslinking reactions remain to be completed from beginning to end.

The present invention will be further described with reference to one form of apparatus suitable for producing polyurethane foams from polyalkylene ether glycol-prepolymer starting materials and similar starting materials, the operation of the apparatus being described for purposes of illustration when the preferred starting materials are used.

Referring more particularly to FIG. 1, a prepolymer of a polyalkylene ether glycol and a polyisocyanate (preferably containing an excess of polyisocyanate and isocyanato end groups) containing a silicone oil dispersed therein is charged into tank 1 while an activator mixture comprising water, a reaction catalyst, and a crosslinking agent is charged into tank 2. The prepolymer is pumped at a desired rate through a mixing device 3 by means of a gear pump 4 or other suitable device. The activator mixture is also pumped into the interior of the mixer 3 by pump 5 at pressures substantially higher than the back pressure in the mixing device itself where the activator and prepolymer are quickly and intimately mixed before being discharged through discharge nozzle 6 into a receiving pan 7 where the resultant mixture is allowed to rise to full height to form a cellular polyurethane elastomer.

As best seen in FIG. 2, the liquid prepolymer stream containing the siloxane polymer enters the mixing device through conduit 10 into an enclosure 11 where the velocity of the prepolymer stream is slowed down temporarily and then rapidly accelerated as the prepolymer flow is restricted between narrowing interior side walls 12 of the mixing device 3 which form the enclosure 11 and between injection nozzle portion 14 of injection nozzle member 15. The activator mixture in turn is forced into a mixing chamber 16 preferably but not necessarily at substantially higher pressure than in said mixing chamber. By using a high pressure and a relatively small stream which spatters on upper portion 17 of a generally conical shaped member 18, a very thorough mixing action with the prepolymer is provided.

In this manner quick and uniform mixing is obtained. The above mixing action is further augmented by a homogenizing action as the stream of mixed reactants flows between the gradually expanding inner side walls 19 of the mixing device 3 which form mixing chamber 16 and tapered side wall 20 of the cone-shaped member. The stream of mixed reactants flow down through openings 22 in a slotted peripheral flange 23 of the cone-shaped member 18 and pass into a discharge chamber 25 for further turbulence and mixing action. Thereafter the mixture is discharged from the mixing device through the nozzle portion 6 of discharge nozzle member 27 as previously indicated.

It can be seen in FIG. 2 that discharge nozzle member 27 and injection nozzle member 15 may be cleaned easily by merely unscrewing the members from the mixing device itself. It is also noted that the cone-shaped member 18 is held in place by clamping its slotted ring between a shoulder 28 of the discharge nozzle member 25 and ring seating portion 29 of the mixing device. The cone-shaped member also may be conveniently removed from the device for cleaning when the discharge nozzle member is removed from the body of the mixing device.

In accordance with the present invention, the activator and prepolymer are preferably both introduced into the mixing chamber 16 continuously at relatively high pressures (say 200 to 2000 p.s.i.) or, in any event, above the back pressure of the mixing chamber 16 which may be of the order of about 20 to 100 p.s.i. depending upon the viscosity of the reactant components as well as the type and number of restrictions inside the mixing device. It may sometimes be desirable to introduce one of the two feed streams, particularly the activator mixture, in the mixing chamber intermittently at high frequency, say at a rate of 4000 to 10,000 injections per minute, again at a pressure above that of the back pressure of the interior mixing chamber 16 of the mixing device 3.

It will be understood that apparatus substantially different from that shown in the drawings may be employed in performing the methods of the present invention. While an excellent method of mixing the prepolymer and activator mixture is by bringing them together under relatively high pressures in an enclosed chamber, they may also be mixed in other ways, such as by means of mechanical stirrers at normal atmospheric pressure, or by the mixing device herein described in which its mixing action is augmented by mechanical stirrers or a stream of compressed air which may strike the reactant mixture stream tangentially near the discharge nozzle as long as a dihydrocarbon-substituted siloxane polymer is included with the prepolymer-activator mixture.

The silicone oils may first be emulsified in water and this emulsion combined with polyurethane catalysts and additional water, if necessary, to form the activator component.

Various polyether polyols having 2 to 3 hydroxyl groups may be used in the methods of this invention. Bifunctional polyethers such as polyether glycols or the like may be used or other polyfunctional polyethers having 3 or 4 hydroxyl groups may be used. Excellent results may be obtained using polyalkylene ether glycols and suitable crosslinking agents.

The polyether glycols used in this invention usually have the general formula $HO(RO)_n-H$, where $n$ represents an integer greater than 1 and R represents divalent aliphatic radicals such as methylene, ethylene, propylene, butylene, isopropylene, isobutylene, etc. or aromatic hydrocarbon radicals such as phenylene. The aliphatic or aromatic radicals may be the same or different. Where R is an alkylene radical it usually contains at least 2 and preferably contains 3 to 4 carbon atoms.

The integer represented by $n$ is such that the polyether glycol has a high molecular weight. The average molecular weight must be greater than 750 to obtain benefits of the invention as applied to elastomeric foams and should be at least 900. The best physical properties in the resultant cellular elastomeric polyether urethanes are obtained when the molecular weight is at least 1500 or 2000 and no more than 4000 or 5000. However, some of the benefits of the invention may be obtained when the molecular weight of the polyether glycol is as high as 10,000.

The average molecular weight of the polyalkylene ether glycols or other hydroxyl-containing polyethers used in the methods of this invention should be substantially greater than 750 and sufficient to produce high quality elastomeric foams as distinguished from semi-rigid foams. As I pointed out in copending applications Serial Nos. 626,314 (now U.S. Patent No. 2,993,869 granted July 25, 1961) and 626,315, filed December 5, 1956, the polyethers generally used for producing the flexible cellular polyurethanes preferably have molecular weights from about 1500 to 2500 and the best results are obtained with polyethers such as polypropylene or higher glycols having a molecular weight of 2000 to 3000.

The above polyether glycols, which are well known and generally available commercially, may be prepared by the polymerization or copolymerization of alkylene oxides, such as ethylene oxide, propylene oxide, or butylene oxides; arylene oxides such as styrene oxide; epichlorohydrin; substituted oxtenanes; etc. Each of the mixed polyalkylene ether glycols specifically mentioned herein has at least 75% of its groups derived from one alkylene oxide and the remainder derived from another alkylene oxide, but it will be apparent that various other mixed polyalkylene ether glycols may also be employed. It is preferable to employ polyether glycols derived principally or entirely from alkylene oxides having 3 to 4 carbon atoms such as propylene oxide or butylene oxide. Such glycols have 3 carbon atoms between ether oxygen atoms. Excellent results can be obtained with polyether glycols derived from a mixture of a large amount (i.e., at least 90%) of such alkylene oxide having 3 to 4 carbon atoms and a small amount (i.e., up to 10% by weight) of an alkylene oxide (ethylene oxide) having only 2 carbon atoms, such as a 90/10 poly(propylene-ethylene) glycol or other polyglycol composed essentially of groups derived from propylene oxide. The polyether glycols made from tetrahydrofuran are generally too expensive for extensive commercial use. Conventional polypropylene ether glycols, which contain a large proportion (usually more than 80%) of secondary hydroxyl groups are substantially less reactive than polyethylene ether glycols, whose hydroxyl groups are primary, but nevertheless produce much better flexible foams when used with the crosslinking agents of this invention.

It will be understood that the polyfunctional polyols reacted with the polyisocyanates to produce the prepolymer mixture may include, in addition to the above-described polyether glycols, minor amounts of simple polyols to facilitate cross-linking. It is preferable, however, to employ part or all of the simple polyol crosslinking agents in the activator mixture employed to react with the prepolymer.

The term "simple polyol" is used herein to describe low molecular weight polyols consisting of alkyl and hydroxyl groups, such as glycerol, trimethylol propane, butanetriol, hexanetriol or the like.

Various aliphatic and aromatic polyisocyanates having 2 to 3 reactive isocyanato groups may be used in the methods of this invention, but it is preferable to provide bifunctional rather than trifunctional isocyanates. Among bifunctional isocyanates which may be used are aliphatic diisocyanates, such as hexamethylene diisocyanate; arylene diisocyanates, such as m-phenylene diisocyanate, p-phenylene diisocyanate, 2,4-tolylene diisocyanate, and 2,6-tolylene diisocyanate; other organic diisocyanates; and mixtures of any of these diisocyanates. It is often preferable to employ a mixture of 2,4- and 2,6-tolylene diisocyanates consisting of at least 65% by weight of the 2,4-isomer, such as (80/20) tolylene diisocyanate.

In the preparation of these foams, one equivalent weight of a polyalkylene ether polyol is first reacted with at least 1.1 equivalents and preferably no more than 6 equivalents of an organic polyisocyanate which preferably has 2 reactive isocyanato groups to provide a higher molecular weight polyurethane containing some free isocyanato (NCO) groups. Some unreacted polyisocyanate may also be present. External heating is not essential, but the preferred temperature for the reaction is usually about 90 to 120° C. A product of this type is referred to herein as a "prepolymer." It is preferable to add more of the polyisocyanate to the prepolymer to adjust the NCO content to about 8 to 10 before it is employed to make elastic foam.

This prepolymer may then be mixed with a small amount of water, a crosslinking compound containing a plurality of active hydrogen atoms, a silicone oil, and a reaction catalyst as previously indicated. Thorough mixing of these ingredients gives rise to a flexible (elastomeric) foam which shows improved resiliency along with better humidity aging properties. Resiliency is not decreased with wringing of the foam so that the foam stands up well under flexing conditions.

The water and reaction catalyst are generally prepared separately from the prepolymer by dissolving or otherwise dispersing the catalyst in water to form an aqueous dispersion called an activator mixture. The activator mixture is used to help catalyze and coordinate the various chemical reactions and physical changes taking place so that the polyether-urethane polymer will be strong enough to entrap the $CO_2$ when it expands. While some of the activator ingredients as well as the silicone oil may be dispersed in the prepolymer prior to reaction, it is preferred that the reaction catalysts and any crosslinking agents be dispersed or dissolved in the aqueous activator mixture and the silicone oil be dispersed throughout the prepolymer before reacting the two components.

In order to obtain the crosslinking necessary to entrap the carbon dioxide gas formed and to provide a high quality elastomeric foam, it may be necessary to employ, with the diisocyanates, at least some polyfunctional material such as a polyamine or a polyol having 3 to 4 hydroxyl groups. If, for example, the polyether polyols used to form the prepolymer do not include a polyether triol or a simple polyol but are instead formed wholly of bifunctional reactants, such as polyether glycols, it may be necessary to employ a polyfunctional crosslinking agent in addition to the water and reaction catalyst.

The representative crosslinking compounds or crosslinking agents containing a plurality of active hydrogens include various polyols and polyamines of low molecular weight (i.e., usually 3 to 14 carbon atoms) such as triamines, tetramines (including hexamethylene tetramine), triols and tetrols having 3 to 4 functional groups. Such compounds preferably consist solely of carbon and nitrogen atoms and atoms (nitrogen and/or oxygen atoms) having an atomic weight of about 14 to 16. The representative crosslinking compounds include low molecular weight polyols such as saturated acylic aliphatic monomeric polyols having 3 to 6 carbon atoms and 3 to 4 groups of the formula

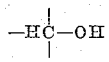

Examples of such monomeric polyols consisting solely of alkyl and hydroxyl groups are trimethylol propane; glycerol; 1,2,4-butanetriol; 1,2,6-hexanetriol and pentaerythritol. Other representative crosslinking agents which have 3 to 14 carbon atoms and which consist solely of (1) hydrocarbon groups and (2) groups connected only to hydrocarbon groups and selected from the group consisting of hydroxyl groups, ether groups and amine groups, include saturated acyclic aliphatic monomeric compounds such as "Triol 230," which is the beta ethanol ether of 2-methyl-, 2-methylol-, 4-methyl-, 5-hydroxy pentane; simple oxide adducts of saturated acyclic aliphatic monomeric polyamines, such as "Quadrol," which is N,N,N,'N'-tetrakis (2-hydroxypropyl) ethylene-diamine; and various known crosslinking compounds. It will be noted that the above mentioned crosslinking agents have no more than two hydroxyl groups for each amine group and that most of them are saturated acyclic aliphatic compounds free of double and triple carbon-to-carbon bonds and free of carbonyl groups. The above crosslinking agents contain 3 to 4 functional groups having active hydrogen atoms (i.e., hydroxyl or amino groups) which are preferred in order to obtain the best physical properties in the resultant foamed materials.

The amounts of crosslinking agent, when used, may be varied widely depending on the stiffness of the sponge desired. When less than 0.5 part per 100 parts by weight of organic reactants (polyether polyol plus isocyanate) is used, the foamed material is often too soft or insufficiently cured for most purposes. Usually at least 1% to 5% or 6% of the total of polyether and isocyanate present is used, and up to 9% to 10% is sometimes used in some less flexible type foams. Up to 20% may be used in some rigid foams since excessive crosslinking is more desirable therein.

The above-mentioned crosslinking agents have a relatively low molecular weight as compared, for example, with other polyols used for a different purpose, such as castor oil. It is known that castor oil has been used for making semi-rigid foams as disclosed, for example, in United States Patent No. 2,787,601 and that castor oil can be used in small amounts as disclosed in Pace Patent No. 2,888,413 to prevent collapse of a foam, but while castor oil has substantial utility in the making of semi-rigid foams, it has no utility in the manufacture of flexible (elastomeric) polyurethane foams.

The amount of water used in accordance with the present invention is dependent to some extent on the characteristics of the foam desired. The amount of water used preferably should be about 0.7% to 1.5% of the weight of the prepolymer although as little as 0.5%, and as much as 2.5% may be used in some instances. More than 5.0% of water causes excessive formation of polyurea linkages. Superior results are obtained by limiting the amount of water to form urethane crosslinkages rather than using greater amounts of water to obtain more urea linkages.

Various catalysts for the diisocyante-polyether foaming reaction may be employed in the methods of this invention to obtain proper foaming. Other compounds such as cobalt and nickel haphthenates and linoleates, etc. are useful catalysts, but it is preferable to employ tertiary amine reaction catalysts and particularly those having an oxygen atom connected to a carbon atom beta to the nitrogen atom and consisting solely of carbon, hydrogen, oxygen and nitrogen atoms, such as morpholines (i.e., N-hydroxyethyl morpholine) or beta amino ethanols. The beta amino ethoxy structure of the latter catalysts is not essential, however, Representative tertiary amine catalysts for the diisocyanate-polyether foaming reaction include alkyl tertiary amines, such as trihexylamine, tributyl amines, triamyl amines, or tripropyl amines, amino alcohols including alkyl diethanol amines or similar dialkanol amines having preferably 2 to 8 carbon atoms (such as butyl diethanol amine) and dialkyl ethanol amines or other dialkyl alkanol amines having preferably 1 to 4 carbon atoms in each alkyl group (such as dibutyl amino ethanol); various other acyclic compounds such as di(ethylene amino ethanol) adipate; heterocyclic compounds such as morpholines and pyridines, and various other catalysts. It will be noted that any oxygen atom in a main molecular chain is directly connected to carbon atoms. The preferred amino alcohols are beta amino ethanols, such as dibutyl amino ethanol or butyl diethanol amine, having a free hydroxyl group on a carbon atom beta to the nitrogen. The morpholines used in this invention are preferably N-substituted morpholines, such as N-methyl morpholine, N-phenyl morpholine or N-octyl morpholine having 1 to 8 or more carbon atoms in the substituent group. The pyridine compounds used may be 4-pyridine propanol, 4-n-amyl pyridine or similar aliphatic-substituted pyridine having 2 to 5 or more carbon atoms in the substituent group.

Generally alkyl tertiary amines give faster acceleration than amino alcohols or morpholines or pyridines. Mixtures of alkyl tertiary amines with either morpholines or amino alcohols or pyridine compounds are preferred to give a more controllable acceleration. However, in some cases, especially when the amount and rate of crosslinking is adequate, the trialkyl tertiary amines produce excellent cellular products.

The amount of catalyst used is generally about 0.5% to 2% of the weight of the prepolymer. When the amount is less than 0.5%, and particularly when it is less than 0.1%, the reaction is generally too slow for economy, and when much more than 3 or 4% (i.e., more than 5%) of the catalyst is used, waste of catalyst and deterioration in quality may result.

In preparing the dry prepolymer, the materials may be reacted in stages, for example, by first reacting the polyalkylene ether glycol with only a small amount of an organic diisocyanate or vise versa. Thus a molar ratio of glycol to diisocyanate of about 2:1 may be used to provide a few glycol units coupled with isocyanate of a given type. After this reaction 2 moles of another diisocyanate may be added to change the character of the material or give a different coupling unit. If the same diisocyanate is used a different result is obtained. Similarly, particularly when the polyether is not in excess, additional polyether of the same or different type may be added to duplicate or provide a change in the units along the polyurethane chain.

Alternatively a viscous long chain product may be obtained by reacting nearly equal molar amounts of polyglycol and the polyisocyanate, which may then be reacted in one or more additional steps with the same or different polyisocyanates and an excess of isocyanate over glycol added prior to its mixture with water to form a foamed material. The highly viscous prepolymer prepared with near equal amount of glycol and isocyanate may also be mixed with one or more lower molecular weight polyurethanes prepared when either the glycol of the isocyanate is in substantial molar excess over the other to radically change the characteristics of the building blocks of the polyurethane chain of the sponge prepared from the prepolymer. Thus, properties of the foamed materials may be predesigned and changed so as to alter the properties of the final product such as resiliency and flexibility at low temperatures.

Dry polyalkylene ether glycols may also be pre-reacted with organic triisocyanates to form a "prepolymer." This "prepolymer," then, in accordance with this invention, when subsequently reacted with an activator mixture containing catalyst silicone oil, and water, also produces excellent resilient and humidity-aging-resistant polyurethane foamed materials.

It has been found that a cure at above normal temperatures such as in the neighborhood of about 70° C. to 110° C. for a short time is advantageous after the foam has risen to its maximum. Wringing of the products have tertiary amine catalysts at intermediate stages during the treatment or at any time after the products have set to the non-tacky state gives the surprising result of greatly increasing the resilience of the foam and is particularly true when wringing is followed by further curing for a short time at elevated temperatures. Several passes through wringer rolls to break bubbly structure and remove entrapped gas give great improvement.

To be acceptable for commercial production a so-called "flexible" polyurethane foam (an elastomeric foam cushion, for example) must have a high quality, and the method of manufacture must be simple and reliable. It is difficult to obtain much blow let alone control cell size or obtain a uniform pore size without using substantial amounts of a silicone oil as hereinafter more fully described. A special additive of this nature is usually essential for commercial manufacture of polyether urethane foams by the prepolymer method.

I have found that polyether urethanes require relatively large amounts of silicone oil (preferably at least 0.5% of the weight of the polymer of polyether and isocyanate) to increase stability of the polyether during foaming. As much as 2 percent or more by weight based on the weight of the prepolymer has been used but materially larger amounts are not desirable. The amount used is to a great extent determined by economy. About 0.5 to 1 percent provides the resultant foam with excellent cell structure and is generally preferred. A few special combinations of particular materials permit use of smaller amounts of the oils (i.e. as low as 0.1%) but it is difficult to select materials which will produce excellent foams with less than 0.25% of such oils.

Extremely small amounts of silicone oils have been incorporated in polyester urethanes, but the effect there is quite different from the effect in polyether urethanes since the silicone oil acts only to control pore size in the polyester urethane foam and is not needed to facilitate commercial manufacture. Polyester foams are extremely and adversely sensitive to substantial amounts of silicone oil, and it is therefore, undesirable to employ more than 0.01 or 0.02% of such antifoaming agent as indicated, for example, in French Patent No. 1,153,994. Higher amounts of silicone oils in polyester urethane foams lead to collapse during the early stages of foam rise.

It is now well known that the effect of silicone oil in polyester urethanes is defoaming rather than stabilizing as becomes apparent from the fact that polyester foam will collapse if made in apparatus previously used for making polyether urethane without thorough solvent cleaning to remove residual silicone oil.

In polyether foams, however, I have discovered that the effect of large amounts of silicone oil is surprisingly opposite, the effect being to stabilize the polyether-urethane foam and to permit the formation of an article of low-density.

Silicone oils that markedly improve the cell structure of polyether-urethane foams are polyorgano siloxanes such as liquid polyalkyl siloxanes including polydimethyl and polydiethyl siloxanes, polydipropyl siloxanes, and liquid polyaryl siloxanes including polydiphenyl siloxane or mixed poly-arylalkyl siloxanes such as poly-methyl-phenyl siloxanes or liquid mixtures of one or more of such siloxanes.

In accordance with the above, oily siloxane polymers having recurring units of the following structure are useful in the present invention:

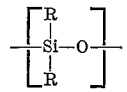

where each R is a hydrocarbon radical preferably having 1 to 6 carbon atoms such as meythl, ethyl, propyl, butyl, amyl, hexyl or phenyl. Each such hydrocarbon radical may be the same as or different from the other radicals. The siloxane polymers are generally terminated with a

group, although part or all of the methyl groups may be substituted for by other alkyl groups, such as ethyl or propyl, or by an aryl group such as phenyl. The terminal groups in the preparation of dimethyl siloxane polymers are the —Si(CH$_3$)$_3$ groups.

The preferred silicone oils usually have the general formula

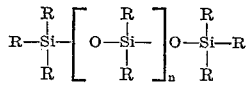

where $n$ is an integer and each R is a hydrocarbon radical of 1 to 6 carbon atoms. Excellent results are obtained using polydimethyl siloxanes where all of the hydrocarbon groups R are methyl groups.

For best results of uniformity of pore size, the silicon oil should be poly dimethyl siloxane. One particularly effective silicone oil is "Dow Corning-200 Fluid"—silicone oil which is a liquid water white dimethyl siloxane polymer generally having a viscosity of about 50 centistokes at 25° C. and a pour point of —67° C. (ASTM D–97–39, Sections 5 to 7.) Another very effective silicone oil is General Electric SF 96 (100) silicone fluid which is a dimethyl siloxane polymer having a viscosity at 100° F. of 100 centistokes, a pour point of —53° F., and a specific gravity (20/20° C.) of 0.965.

The viscosity of the siloxane polymer used is of importance. The lower viscosity silicone oils are more effective and may be used in smaller amounts to obtain the effects of larger amounts of the higher viscosity silicone oils.

Whatever the reason for the outstanding results obtained, the silicone oils having a viscosity of 10 to 1000 centistokes at 25° C. and preferably 50 to 500 centistokes provide the resultant foams with excellent cell structure as well as other valuable properties when used in the amounts specified above. Suitable silicone oils may, for example, have a viscosity of 40 to 400 or 500 centistokes at 100° F. Most frequently the silicone oils used in the process of this invention have a viscosity of about 50 to about 300 centistokes at 25° C. Generally those siloxane polymers having a low viscosity less than about 5 centistokes at 25° C. are undesirable. It will be understood, however, that blending permits use of small amounts of very high and very low viscosity oils.

Even though larger amounts of silicone oils are required for the higher viscosity oils, difficulty in mixing is had with such high viscosities (i.e., above about 1000 centistokes at 25° C.). Apparently these more viscous polymers cannot be sufficiently dispersed unless used with some solvent to operate as an effective pore-size controller. Small amounts of solvents, however, are undesirable and may, for example, create foaming difficulties due to their high vapor pressure.

It will be understood that the materials and methods disclosed in my copending application Serial No. 626,313, and my application Serial No. 707,351, may be employed when making polyetherurethane foams according to this invention.

PART II

Surprisingly, it has been found that the selection of a particular type of diisocyanate makes a profound difference in the properties of polyether urethane foams made by the method of this invention as pointed out in my copending application Serial No. 711,179, now abandoned. By using meta or para phenylene diisocyanates or mixtures thereof as all or a substantial part of the diisocyanate, an improved foamed product may be obtained. The hydrolytic stability of this product is exceptional, the resiliency is excellent, and the loading curves closely resemble those of the highly regarded latex foams.

Even a relatively small amount of meta or para phenylene diisocyanate or mixtures thereof used as part of the total polyisocyanate, say 5 percent by weight, impart some benefits to the resultant foamed products made by the procedures set forth in Part I. The foams cure faster to a lower compression set value and they are much more resilient and hydrolytically stable. In addition, the foams are of a lower density than when none of the phenylene diisocyanates are used which is very desirable for cushioning material. The hydrolytic stability and compression set values are particularly much improved when the amount of phenylene diisocyanate is 10 percent by weight of the total polyisocyanate used. However, for most commercial uses, 20 percent by weight of phenylene diisocyanates are preferred, the density being relatively low. The humidity aging and 25 percent compression deflection properties are, as well as other valuable properties, also improved over those foamed materials made with a lower amount of phenylene diisocyanates, say 5 percent, in the polyisocyanate mixture. The meta phenylene diisocyanates inherently provide products having improved light stability.

The best results are obtained when at least 50 percent of the total diisocyanate employed in the prepolymer is a phenylene diisocyanate as evidenced by substantial improvement in some of the physical properties such as compression set. Actually, the compression set values of the foamed materials reach their lowest values when all the polyisocyanate used is a phenylene diisocyanate.

The glycols and/or triols, the polyisocyanates, the catalysts, the activator mixtures, the crosslinking agents (if any), the silicone oils and other materials used and the procedures used in this Part II may be as indicated in Part I. The same polyalkylene ether polyols may be employed and the same wringing and curing procedures may be employed.

Among bifunctional isocyanates which may be used as the balance of the total polyisocyanate used are hexamethylene diisocyanate; 2,4-tolylene diisocyanate; 2,6-tolylene diisocyanate or other diisocyanates, and mixtures of any of these diisocyanates.

In the preparation of these foams, an equivalent weight of polyalkylene ether glycol is first reacted with from 1.1 to 12 equivalents or more, and preferably from about 2 to 6 equivalents of an organic polyisocyanate mixture (preferably comprising at least 25 percent by weight of phenylene diisocyanate) which preferably has 2 reactive isocyanato groups to provide a higher molecular weight polyurethane prepolymer containing some free NCO groups. Some unreacted polyisocyanate may also be present.

A cross linking agent of the type described above may, if desired, be incorporated in association with the activator and water in the manner indicated in Part I.

When silicone oil is present in appreciable quantities (i.e., 0.5% to 5% or so, of the polyether-isocyanate prepolymer) substantial amounts of a cross linking agent may not be necessary but such cross linking agent is preferred when bifunctional glycols are used to form the prepolymer. However, larger amounts of catalyst or activator would then be required to obtain the best properties in the foam. The water and catalyst described above may be used in the manner described above to produce the polyurethane foam.

The viscosity of the prepolymer may range from 1500 cps. (Brookfield) at 25° C. up to 100,000 cps. (25° C.) depending upon the types of polyether glycols and polyisocyanates used as well as their amounts with relation to each other. Higher viscosity prepolymers may require heating to 150° F. or thereabouts to permit better flow characteristics while pumping to the mixing machines.

When the pH of the polyether glycol is alkaline, the use of acid chlorides in the prepolymer to deter premature gelling may be desirable as described in U.S. Patents Nos. 2,620,349 and 2,692,873.

It will be understood that the method defined in Part II hereof may correspond exactly with the methods disclosed in my copending application Serial No. 711,179 and that the materials disclosed in said application may be used.

PART III

Example I

A prepolymer was formed from 600 parts by weight of a poly 80/20 (ethylene-propylene) ether glycol having a molecular weight of about 2000 and 200 parts by weight of a 65/35 mixture of a 2,4- and 2,6-tolylene diisocyanates. A silicone oil was dispersed in the prepolymer using 1 percent by weight based on the prepolymer of the oil. The silicone oil was a liquid dimethyl siloxane polymer having a viscosity of 100 centistokes at 100° F.

The prepolymer was charged into a tank similar to tank 1 of FIG. 1 in preparation of subsequent mixing in a mixing device 3 (FIG. 1)

An activator mixture was prepared according to the following formula:

| | Parts by weight |
|---|---|
| Water | 1.3 |
| N-methyl morpholine | 1.5 |

The activator mixture was stored in a tank separate from the prepolymer and the two components fed into the mixing device at pressures of about 500 p.s.i. at the rate of about 100 pounds of prepolymer per 2.8 lbs. of activator mixture.

The thoroughly mixed reactants were discharged into a pan and allowed to reached full height. The resultant foamed slab was cured at 100° C. for 12 hours. The polyether urethane foamed products had excellent properties including good resiliency, good resistance to hydrolysis and relatively low compression set.

Example II

A prepolymer is prepared by reacting 600 parts by weight of "Ucon 75 H 1400," a mixed poly(ethylene-propylene) ether glycol from Union Carbide and Carbon Corporation with an average molecular weight of 2500, with 180 parts of a 65/35 mixture of 2,4- and 2,6-tolylene diisocyanates.

The two reactants are mixed at room temperature which gives rise to a slight exotherm. When the temperature of the mixture levels off, the heat is turned on so that the batch temperature will reach approximately 100° C. in a period of one hour. The batch is then maintained at this temperature for an additional hour followed by cooling. The prepolymer thus obtained is a viscous but pourable liquid at room temperature and is used to produce a foamed polyurethane rubber sponge.

Example III

A polyurethane foamed material was formed according to the following formula:

130 parts of prepolymer of Example II
5 parts of Quadrol (N,N,N',N'-tetrakis (2-hydroxy propyl) ethylene diamine)
1.3 parts water
1 part silicone oil DC–200 (polydimethyl siloxane)
1.5 parts N-methyl morpholine The silicone oil helps in improving cell structure and is first dispersed in the prepolymer. The Quadrol, water and N-methyl morpholine were first mixed together, the prepolymer plus silicone oil was then mixed with these ingredients and the whole poured into a mold and allowed to rise to full height. The raised foam was cured overnight at 100° C.

Foam density was slightly over 6 lbs. per cubic foot. It was passed through squeeze rolls with just enough spacing to allow the sponge to pass therethrough without tearing it so as to rupture cell walls. After 24 passes the rebound was 37 percent as determined by the Schopper Rebound Tester. Compression deflection (25%) using a 10 sq. in. (slab) foot was 12 pounds. Compression set (ASTM method B) was 6.7 percent.

In the above example, the silicone oil DC–200 is a liquid water white dimethyl siloxane polymer, sold by Dow Corning, generally having a viscosity of about 50 centistokes at 25° C. and a pour point of −67° F. (ASTM D–97–39, Sections 5 to 7).

Example IV

A prepolymer was prepared by reacting 600 parts of a mixed poly(ethylene-propylene) ether glycol having an average molecular weight of 3700 with 180 parts of 65/35 mixture of 2,4- and 2,6-toluene diisocyanates. The reaction conditions and procedure were identical to those of Example II, only the reactants were somewhat modified. The 125 parts of viscous prepolymer thus prepared was mixed with 5 parts Quadrol, 1.3 parts water, 1.0 parts N-methyl morpholine, 1.0 part DC–200 oil with the procedure outlined in Example III, and the material cast and allowed to rise.

Foam density of the resultant foam, cured as the foam of Example III was 7.5 lbs./cu. ft. After 24 passes through the squeeze rolls, rebound was 38%; 25% compression deflection (10 sq. in. slab) was 20 lbs. Compression set (ASTM method B) was only 9%.

Example V

A prepolymer was first prepared by reacting 500 parts of polypropylene ether glycol of average molecular weight of 2725 and 180 parts of a 65/35 mixture of 2,4- and 2,6-toluene diisocyanate by the above outlined procedure. Next, 130 parts of the prepolymer thus obtained were mixed with the following ingredients by the procedures of Examples III and IV and the fully raised cast foam was cured as was the foam of Example III.

4.3 parts Triol 230 (Beta ethanol ether of 2-methyl, 2-methylol, 4-methyl, 5-hydroxy pentane)
1.5 parts tributylamine 1.3 parts water
1.0 part DC-200 silicone oil
0.5 part "Igepal Co-630," a nonyl phenoxy polyoxethylene ethanol made by General Aniline Density of foam was 6 lbs./cu. ft. After 20 passes through wringer, rebound was 30%; 25% compression deflection (10 sq. in.) was 11 pounds. Compression set (ASTM method B) was 15.8%.

*Example VI*

A prepolymer was prepared from "Carbowax 1000" (a polyethylene ether glycol having a molecular weight of 1000), tolylene diisocyanate and "Santicizer 140" (cresyl diphenyl phosphate, a plasticizer for polyvinyl chloride made by Monsanto Chemical Co.) according to the following recipe:

| | Grams |
|---|---|
| Carbowax 1000 | 113 |
| 2,4-tolylene diisocyanate | 40 |
| Santicizer 140 | 10 |

The above materials were mixed together with slight warming in a beaker at about 40° C. The heat of reaction increased the temperature to about 65 to 75° C. after which the temperature was slowly increased to 100° C. The temperature was maintained at 75 to 95° C. for about 75 minutes and then reduced to room temperature. The viscosity of the resulting prepolymer material was about 40,000 centipoises at 25° C.

An activator mixture was prepared from water, a reaction catalyst, a crosslinking agent and "Tween 60" (Sorbitan monostearate polyoxyalkylene derivative, an acid-resistant emulsifying agent formed by condensing ethylene oxide with Sorbitan monostearate and manufactured by Atlas Powder Co.) according to the following recipe (Sorbitan is mono anhydro Sorbitol):

| | | |
|---|---|---|
| Trimethylol ethane | grams | 2.4 |
| N-methyl morpholine | do | 1.0 |
| Water | cc | 2.0 |
| Tween 60 | drops | 3 |

An elastic cellular foam was then prepared by mixing and reacting 68 grams of the prepolymer with 1.5 cubic centimeters (cc.) of the activator mixture. The resulting foam was highly resilient. The 25% compression deflection (10 sq. in.) was 9 pounds.

*Example VII*

130 parts by weight of prepolymer prepared from 600 parts of a polypropylene ether glycol with an average molecular weight of 2025 and 180 parts of 2,4-toluene diisocyanate
1.3 parts water
1.5 parts N-methyl morpholine
1.0 part DC-200 silicone oil
1.5 parts 1,2,4-butanetriol The above ingredients were mixed by the same procedure used for the previous examples (i.e., Examples II to VI) and the resulting foam cured and subjected to wringing to break closed cells and replace contained gas with air or moist air. The foam had the following properties:

Density—7.25 lbs./cu. ft.
Rebound after 40 passes through wringer—27%
Compression set (ASTM method B)—6.2%

While the above examples are primarily concerned with the preparation of foams by the methods described therein, it is possible that these foams may be prepared by the rapid, common mixing of the separate components, such as the usual mixing method of making cellular polyurethane wherein ordinarily a viscous liquid polyether is pumped at a controlled rate through a nozzle. A polyisocyanate, preferably a diisocyanate having two isocyanate groups, is also pumped at an extremely high pressure to the nozzle, where it contacts the stream of polyether and is thoroughly mixed therewith because of its high velocity. A small amount of water usually is also introduced into the nozzle either as a jet stream by itself or in admixture with the polyether. The catalyst, such for example as a tertiary amine or a mixture as above mentioned, is also preferably mixed with the polyether or introduced into the nozzle. A stirrer may be present in the nozzle to insure homogeneous mixing. From the nozzle, the material is deposited as a layer into a relatively moveable mold which is moved in a continuous manner relative to the nozzle in order to provide the desired layer of viscous reactants on the bottom thereof. Thus, it is apparent that the process of the present invention can be used with any of the usual mixing procedures of making foamed polyurethanes without requiring expensive and undesirable alterations.

As pointed out in my copending application Serial No. 707,351, now abandoned, high molecular weight alkylene oxide adducts of simple polyols (i.e., glycerine) or other polyfunctional polyols (i.e., commercial triols) may also be used alone or with polyether glycols to form prepolymers by their interaction with organic polyisocyanates. These prepolymers can be foamed under conditions described in previous examples.

Various commercial triols such as Dow "112-3" triol and Carbide "LG-56" triol may be used as disclosed, for example, in my copending application Serial No. 810,992, filed May 5, 1959. "112-3" triol is a propylene oxide adduct of glycerol capped with a little ethylene oxide during its manufacture, has 3 primary hydroxyl radicals and a molecular weight of from about 2800 to 3100, and is made by the Dow Chemical Company. "LG-56" triol is a propylene oxide adduct of glycerol containing substantially 90 to 95% secondary hydroxyl radicals, an OH number of about 56 and an average molecular weight of about 2800 to 3100, and is made by the Union Carbide Corporation.

*Example VIII*

100 parts by weight of the propylene oxide adduct of glycerine (molecular weight of 2800)
0.75 part by weight of tri(nonylphenyl) phosphite
18.6 parts by weight of an 80/20 mixture of 2,4- and 2,6-toluene diisocyanates The above were combined by mixing at room temperature; and, after the exotherm was dissipated, heat was applied to raise the temperature to 100° C. This temperature was maintained for an additional hour whereupon the mixture was cooled.

Viscosity at 23° C. _____ 10,000 cps. (centipoises).
Percent NCO _____ 3.6.

Additional 80/20 toluene diisocyanate was added with mixing to the above prepolymer to raise the percent NCO to a level of 9.5.

*Example IX*

The foam formulation consisted of the following:

75 parts by weight of the prepolymer of Example VIII
0.5 part by weight of silicone oil SF 96 (polydimethyl siloxane—viscosity 100 centistokes at 25° C.)
1.0 part by weight N-methyl morpholine
0.3 part by weight triethylamine
1.7 parts by weight water The silicone oil was proportionately injected into the prepolymer line prior to its entry into the mixing chamber. The amine-water mixture was introduced separately into the mixing head in the proportions indicated above. The resulting foam had a uniform cell structure with a density of 2.5 lbs. per cubic foot, a Schopper rebound of 40% and a 25% compression deflection value of 9 lbs. per 10 sq. inches.

*Example X*

A prepolymer was prepared by reacting 100 parts by weight of polypropylene ether glycol with a molecular weight of about 950 with about 50 parts of p,p'-diisocyanate diphenyl methane.

The two reactants were mixed at room temperature which gave rise to a slight exotherm. When the temperature of the mixture leveled off, the heat was applied to the mixture so that the batch temperature reached approximately 100° C. in a period of one hour. The batch was then maintained at this temperature for an additional hour followed by cooling. The prepolymer thus obtained was a viscous but pourable liquid at room temperature.

The prepolymer material was then reacted with the following materials:

130 parts of prepolymer
5 parts of Quadrol (N,N,N',N'-tetrakis (2-hydroxy propyl) ethylene diamine
1.3 parts water
1 part silicone oil DC—200
1.5 parts di(ethylene amino ethanol) adipate The silicone oil, which helps in improving cell structure, was first dispersed in the prepolymer. The Quadrol, water and tertiary amine catalysts were first mixed together. The above mixture of these ingredients was mixed with the prepolymer and silicone oil and the whole batch poured into a mold and allowed to rise to full height. The raised foamed material was cured overnight at 100° C. The resultant foamed material was of low density and resilient, which properties are desirable for cushioning material.

In accordance with Examples III, IV, and IX, it is noted that, while the preferred method of mixing the prepolymer and activator mixture is by bringing them together under relatively high pressures in an enclosed chamber, the prepolymer and activator mixture may also be mixed by other means such as by mechanical stirrers at normal atmospheric pressure, or by the mixing device herein described in which its mixing action is augmented by mechanical stirrers or a stream of compressed air which may strike the reactant mixture stream tangentially near the discharge nozzle as long as a di-hydrocarbon-substituted siloxane polymer is included with the prepolymer-activator mixture.

The silicone oils may first be emulsified in water and this emulsion combined with polyurethane catalysts and additional water, if necessary to form the activator component.

Examples XI to XIV are intended to illustrate the invention of my copending application Serial No. 711,179 which is disclosed and claimed herein but not to limit the invention.

*Example XI*

A prepolymer was prepared according to the method described in Example II using the formula below:

Ingredients: | Parts by weight
---|---
Polypropylene ether glycol (M.W. about 1850) | 500
Para-phenylene diisocyanates | 185
Trinonylphenyl phosphite | 10

The trinonylphenyl phosphite was first mixed in with the glycol and this solution heated to 145° F. The trinonyl phenyl phosphite is used to stabilize the foamed products particularly against dry aging and weathering as described in United States Patent No. 2,915,496. The p-phenylene diisocyanate, being solid at room temperature, was then heated to above its melting point, and added to the glycol with stirring. The temperature was then maintained at 60–80° C. for 2 hours, followed by 1 hour at 95° C. The resultant prepolymer was then cooled down to room temperature and its percent isocyanate and viscosity determined as follows:

Percent NCO _____ 7.7.
Viscosity _____ 10,000 cps. at 23° C.

The prepolymer was further processed as in Example III according to the following formula:

75 parts above prepolymer
0.7 part silicone oil
1 part N-methyl morpholine
2 parts water The silicone oil was first dispersed in the prepolymer. The tertiary amine catalyst and water were then added and mixed into the prepolymer with rapid stirring. The foamed material rose rapidly and gave a relatively tack-free surface in a matter of minutes.

Tests were conducted on the foamed material, the results of which are indicated below:

Density _____ 3.8 lbs./cu. ft.
Schopper rebound _____ 53.
25% compression deflection _____ 0.6 lbs./sq. in.
Compression set _____ 3.8%.

The percent change in 25% deflection after 70 days exposure at 158° F. and 95–100% relative humidity was only a plus 2.0%.

*Example XII*

Another prepolymer was prepared according to the formula below:

| | Parts |
|---|---|
| Polypropylene ether glycol | 600 |
| Para-phenylene diisocyanate | 54 |
| 80/20–2,4/2,6-toluene diisocyanate | 180 |

The glycol was heated to 95° C. and molten p-phenylene diisocyanate at a temperature of 95° C. was added with stirring. The mixture was then maintained at this temperature for a period of 1 hour. The 80/20 mixture of 2,4- and 2,6-toluene diisocyanates was then added at this temperature, and the batch was further reacted at 95–100° C. for an additional hour. The resultant prepolymer was then cooled to room temperature and certain properties determined as indicated below.

Percent NCO _____ 9.8.
Viscosity _____ 4,000 cps. at 25° C.

The prepolymer was processed in a manner similar to that described in Example III according to the following formula:

75 parts above prepolymer
0.3 part silicone oil
1 part N-methyl morpholine
0.5 part triethylamine
1.5 parts water The properties of the resultant foamed material were determined as indicated below:

Percent Schopper rebound _____ 46.
25% compression deflection _____ 0.62 lb./sq. in.
Density _____ 3.1 lbs./cu. ft.
Compression set _____ 12.4%.

The percent change in 25% deflection after 14 weeks exposure in a circulating air oven at 158° F. was found to be only —2.0%.

*Example XIII*

A prepolymer was prepared using the formula as follows:
(a) 300 parts polypropylene ether glycol (M.W. 2000); 48 parts meta phenylene diisocyanate
(b) 600 parts polypropylene ether glycol
(c) 48 parts meta phenylene diisocyanate
(d) 260 parts TDI: (80/20 mixture of 2,4- and 2,6-toluene diisocyanates)

The glycol and m-phenylene diisocyanate mixture (a) was heated to 100° C. and reacted together at this temperature for 1 hour. The second portion of glycol (b) was then added and the mixture again reacted for one more hour. Then, the m-phenylene diisocyanate (c) was added and the mixture was maintained another hour at 100° C. Finally the TDI (d) was added and the mixture was stirred while it was cooling to room temperature.

The prepolymer was made into foamed polyurethane material as described in Example III using the formula as follows:

75 parts above prepolymer
0.5 part silicone oil
1.0 part triethylamine
1.5 parts water The resultant foamed material was tested for certain properties, the results of which are shown below:

Density _____ 3.0 lbs./cu. ft.
25% deflection _____ 0.5 lb./sq. in.
Compression set _____ 9.0%.

The percent change in deflection after exposure to an atmosphere having a relative humidity of 95–100% and a temperature of 158° F. for 35 days was −7.1%.

*Example XIV*

A prepolymer was formed as previously described (i.e., in Examples I, II, XI, XII and XIII) using the formula as follows:

2000 parts polypropylene ether glycol
200 parts meta phenylene diisocyanate

The above materials were combined and reacted at 60° C. for one hour. Temperature was then raised to 100° C. and reaction maintained there for one more hour. On cooling, the product had an NCO content of 1.56. Then 360 parts of 80/20 TDI was added and mixed in for ½ hour. The resultant prepolymer material had a viscosity of 3870 cps. at 25° C. and a percent NCO value of 8.5.

The prepolymer was further processed to obtain a foamed polyurethane material using a formula as follows:

75 parts above prepolymer
0.4 part silicone oil
0.5 part triethylamine
2.0 parts water The resultant foamed material was tested for certain properties as shown below:

Density _____ 2.85 lbs./cu. ft.
Percent Schopper rebound _____ 48.
25% compression deflection _____ 0.3 lb./sq. in.
Percent compression set _____ 7.7.

For economical reasons it may be desired to convert a polyalkylene ether glycol to an improved foamed polyurethane material with only a small amount of the phenylene diisocyanates. The less expensive polyisocyanate such as a mixture of toluene diisocyanates may be used with the phenylene diisocyanates to raise the percent NCO level to a range whereby lower density foams can be readily prepared.

While polyether foamed materials with the lowest percent of compression set and the fastest curing ability may be obtained when all the polyisocyanate used is meta and para phenylene diisocyanates, it can be seen from Examples XII, XIII and XIV that excellent foamed materials can be obtained by using mixtures of phenylene diisocyanates with other polyisocyanates providing the total polyisocyanate used is at least 10 percent phenylene diisocyanates.

When such polyisocyanate mixtures are used, most of the benefits of the present invention may be obtained including resistance to degradation by high humidity at temperatures appreciably above room temperatures such as, say, 140° F. to 180° F.

Dry polyalkylene ether glycols may also be prereacted with organic triisocyanates to form a dry "prepolymer" as long as phenylene diisocyanates comprise a part of the total polyisocyanate mixture used as previously described.

This "prepolymer," then, in accordance with this invention, when subsequently reacted with organic diols or other crosslinking compound and water also produces excellent resilient and humidity-aging-resistant polyurethane foamed materials.

The silicone oils may also be dispersed in water to provide a stable emulsion and subsequently combined with amine catalysts and additional water, if necessary. The silicones in this form may then be introduced through the activator component so that prior dispersion of the silicone oils in the prepolymer may be avoided.

The polyether glycols of any of the above examples of Part III may be replaced by mixed poly(propylene-ethylene) ether glycols having a small proportion (i.e., up to 10%) of groups derived from ethylene oxide without materially changing the results.

It will be understood "parts" means parts by weight and that percentages are percentages by weight unless the context indicates otherwise.

It will be understood that the above description is by way of illustration rather than limitation and that, in accordance with the provisions of the patent statutes, variations and modifications of the specific methods, compositions and articles described herein may be made without departing from the spirit of the invention.

This application is a continuation-in-part of my copending application Serial No. 626,313, filed December 5, 1956 (now abandoned), a continuation-in-part of my copending application Serial No. 707,351, filed January 6, 1958 (now abandoned), and a continuation-in-part of my copending application Serial No. 711,179, filed January 27, 1958 (now abandoned).

Having described my invention, I claim:

1. The method of making a cellular, flexible polyurethane comprising reacting a polyalkylene ether glycol having a molecular weight of from 750 to 10,000, an organic polyisocyanate having from 2 to 3 isocyanato groups, the molar ratio of said glycol to said polyisocyanate being from 1:1.1 to 1:12, from 0.5 to 5% by weight of water based on the weight of said polyether glycol and said polyisocyanate, and from 0.5 to 6% by weight based on the weight of said polyether glycol and said polyisocyanate of an organic crosslinking agent for the polyether-urethane foaming reaction having 3 to 14 carbon atoms and at least 3 and no more than 4 functional groups, said functional groups containing active hydrogen atoms and being selected from the group consisting of amino groups and

groups, in admixture with from 0.5 to 4% by weight based on the weight of said polyether glycol and said polyisocyanate of a catalyst for the polyether urethane foaming reaction, and a polydialkyl silicone oil to form a polyether urethane foam, curing said foam, and repeatedly passing said foam between squeeze rolls to wring said foam and rupture cell walls without tearing said foam.

2. A cellular, flexible polyether urethane having been repeatedly wrung to rupture cell walls and comprising the foamed reaction product of (1) a substantially moisture free prepolymer comprising the reaction product of a polyalkylene ether glycol having a molecular weight of from about 2,000 to 5,000 with an aromatic diisocyanate, the molar ratio of said glycol to said diisocyanate being from about 1:1.1 to 1:12, (2) from about 0.7 to 5% by weight based on the weight of said prepolymer of water, and (3) from 1 to 5% by weight based on the weight of said prepolymer of an organic crosslinking agent for the polyether-urethane foaming reaction having 3 to 14 carbon atoms and at least 3 and no more than 4 functional groups, said functional groups containing active hydrogen atoms and being selected from the group consisting of amino groups and

groups, in admixture with (4) about 0.5 to 3% by weight based on the weight of said prepolymer of a catalyst for the polyether urethane foaming reaction and (5) about 0.5 to 2% by weight based on the weight of said prepolymer of a polydimethyl silicone oil.

3. In a process of making a high quality elastomeric polyalkylene ether urethane foam of uniform cell size having good resistance to humidity aging by reacting (1) a prepolymer comprising the reaction product of (A) 1 equivalent of a polyalkylene ether glycol having a molecular weight of about 900 to 10,000, the alkylene groups thereof containing from 3 to 4 carbon atoms, with (B) about 1.1 to 12 equivalents of an aromatic diisocyanate, (2) about 0.5 to 2.5% by weight of water based on the weight of said prepolymer, (3) a saturated crosslinking agent for the polyether-urethane foaming reaction having 3 to 4 functional amino groups, and (4) about 0.5 to 4% by weight of said prepolymer of a tertiary amine catalyst, the improvement which comprises: dispersing in said prepolymer (5) at least about 0.5% and not substantially more than 2% by weight based on the weight of said prepolymer of a liquid polysiloxane having a viscosity of about 10 to 1000 centistokes at 25° C. and having recurring units having the formula

the end groups of said polysiloxane having the formula

where each R radical is selected from the class consisting of phenyl and alkyl radicals having no more than 6 carbon atoms.

4. A method for making a polyetherurethane foam which comprises reacting (1) a prepolymer comprising the reaction product of (A) 1 equivalent of a polyether polyol having a molecular weight of from 750 to 10,000 and being selected from the group consisting of polypropylene ether glycols and polypropylene ethylene ether glycols, with (B) from 1.1 to 12 equivalents of an organic polyisocyanate having from 2 to 3 isocyanato groups, (2) from 0.5 to 5% by weight of water based on the weight of said prepolymer, and (3) from 0.1 to 4% by weight based on the weight of said prepolymer of a catalyst for the reaction, in admixture with (4) from 0.5 to 2% by weight based on the weight of said prepolymer of a liquid polysiloxane having a viscosity of from about 10 to 1000 centistokes at 25° C. and having recurring units having the formula

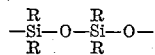

and end groups having the formula

where R is selected from the class consisting of phenyl and alkyl radicals of from 1 to 6 carbon atoms, and (5) from 1 to 6% by weght based on the weight of said prepolymer of an organic cross linking agent for the polyether-urethane foaming reaction having 3 to 14 carbon atoms and at least 3 and no more than 4 functional groups, said functional groups containing active hydrogen atoms and being selected from the group consisting of amino groups and

groups.

5. A process for making elastomeric polyether urethane foam having high resilience and good resistance to humidity aging which comprises the steps of reacting (1) a reaction product formed by reacting 1 mole of a polypropylene ether glycol, which has a molecular weight of about 2000 to 4000 and is free of substantial amounts of water, with 1.1 to 6 moles of a mixture of 2,4- and 2,6-tolylene diisocyanates to form a substantially moisture-free fluid prepolymer having free isocyanato groups that have not reacted with the hydroxyl groups of the glycol, with (2) about 0.7 to 5.0% by weight of water based on the weight of said reaction product, and with (3) about 1 to 6% by weight based on the weight of said reaction product of a saturated acyclic aliphatic monomeric crosslinking compound consisting solely of hydrogen atoms, atoms having an atomic weight of about 14 to 16, and carbon atoms, said crosslinking compound having 3 to 4

groups and 3 to 14 carbon atoms, in the presence of (4) 0.5 to 2% based on the weight of said reaction product of at least one tertiary amine reaction catalyst selected from the group consisting of morpholines, alkyl diethanol amines, and dialkyl ethanol amines, and (5) 0.5 to 2% based on the weight of said reaction product of a polydimethyl siloxane having a viscosity of about 50 to 500 centistokes at 25° C., curing the foam, and repeatedly passing said foam between squeeze rolls to wring said foam and rupture cell walls without tearing said foam.

6. A process as defined in claim 5 wherein said catalyst comprises an alkyl amino alcohol having a free hydroxyl group on a carbon atom beta to the nitrogen atom and said crosslinking compound comprises N,N,N',N'-tetrakis (hydroxyl propyl) ethylene diamine.

7. A process as defined in claim 5 wherein said closslinking compound comprises a saturated aliphatic monomeric cross linking agent consisting only of hydrocarbon groups having 3 to 6 carbon atoms and 3 to 4

groups.

8. A process for making a polyether urethane foam having high resilience and good resistance to humidity aging which comprises the steps of reacting (1) a reaction product formed by mixing and reacting about one equivalent weight of a hydroxy-terminated polyether glycol, which has an average molecular weight of about 1500 to 5000 and which is free of substantial amounts of water, with about 1.1 to 12 equivalent weights of an organic diisocyanate to form a liquid prepolymer having free isocyanato groups which have not reacted with hydroxyl groups of the glycol, with (2) about 0.5 to 5 percent by weight of water based on the weight of the reaction product, in the presence of (3) a polydialkyl silicone oil, (4) about 0.1 to 4 percent by weight of a tertiary amine reaction catalyst, and with (5) about 0.5 to 10 percent by weight of an organic crosslinking agent for the polyether-urethane foaming reaction having 3 to 14 carbon atoms and at least 3 and no more than 4 functional groups, said functional groups containing active hydrogen atoms and being selected from the group consisting of amino groups and

groups, said polyether glycol being formed by polymerization of alkylene oxides having 3 to 4 carbon atoms.

9. A process for making high quality cellular elastomeric polyether urethane foam comprising the steps of reacting (1) a bifunctional liquid isocyanato-terminated prepolymer formed by reacting about 1 equivalent weight of a hydroxy-terminated polyalkylene ether glycol having a molecular weight of about 1500 to 4000 with about 1.1 to 12 equivalent weights of an organic diisocyanate, with (2) an activator mixture in the presence of (3) a polydimethyl silicone oil to cause a foaming reaction which forms carbon dioxide gas while simultaneously forming cells to entrap said gas and which produces a generally uniform cellular structure of high resilience having resistance to humidity aging, said activator mixture comprising about 0.5 to 5 percent by weight of water based on the weight of said prepolymer, about 0.5 to 4 percent by weight of a tertiary amine reaction catalyst for the polyether-urethane foaming reaction, and about 1 to 6 percent by weight of an organic crosslinking agent for the polyether-urethane foaming reaction having 3 to 14 carbon atoms and at least 3 and no more than 4 functional groups, said functional groups containing active hydrogen atoms and being selected from the group consisting of amino groups and

groups.

10. A process for making an elastomeric polyether urethane foam having high resilience and good resistance to humidity aging which comprises the steps of reacting (1) a moisture-free liquid prepolymer mixture having unreacted isocyanato groups and formed by reacting one mole equivalent weight of a polypropylene ether glycol having a molecular weight of about 1500 to 5000 with about 2 to 6 mole equivalent weights of an organic polyisocyanate comprising at least 20% by weight of an aromatic diisocyanate in which the isocyanato groups are attached to an unsubstituted phenylene nucleus, with (2) about 0.5 to 5% by weight of water based on the weight of the mixture and with (3) about 0.5 to 10% by weight of an organic crosslinking agent for the polyether-urethane foaming reaction having 3 to 14 carbon atoms and at least 3 and no more than 4 functional groups, said functional groups containing active hydrogen atoms and being selected from the group consisting of amino groups and

groups, in the presence of (4) a tertiary amine reaction catalyst, in admixture with (5) about 0.5 to 2% by weight of a polydimethyl silicone oil having a viscosity of about 50 to 500 centistokes at 25° C., allowing the resulting foam to expand fully, curing the foam, and passing the foam between squeeze rolls to rupture cell walls without tearing the foam.

11. A process as defined in claim 10 wherein said aromatic diisocyanate is paraphenylene diioscyanate.

12. A process as defined in claim 10 wherein said aromatic diisocyanate is meta-phenylene diisocyanate.

13. A process as defined in claim 10 wherein said oil is mixed with the prepolymer prior to addition of the water and crosslinking agent and said foam is cured after it has reached its maximum rise.

14. A process as defined in claim 10 in which a part of the organic polyisocyanate is a mixture of 2,4- and 2,6-tolylene diisocyanates.

15. A product produced by the process defined in claim 10.

16. A process for making elastomeric polyetherurethane foam having high resilience and good resistance to humidity aging which comprises the steps of reacting (1) a reaction product made by reacting 1 mole of a polypropylene ether glycol, which has a molecular weight of about 2000 to 4000 and is free of substantial amounts of water, with 1.1 to 6 moles of a mixture of 2,4- and 2,6-tolylene diisocyanates to form a substantially moisture-free fluid prepolymer having free isocyanato groups that have not reacted with the hydroxyl groups of the glycol, with (2) about 0.7 to 5.0% by weight of water based on the weight of said reaction product, and with (3) about 1 to 6% by weight based on the weight of said reaction product of a saturated acyclic aliphatic monomeric crosslinking compound consisting solely of carbon atoms, hydrogen atoms, and atoms having an atomic weight of about 14 to about 16, said crosslinking compound having 3 to 4

groups and 3 to 14 carbon atoms, in the presence of (4) 0.5 to 2% based on the weight of said reaction product of a tertiary amine catalyst for the foaming reaction, and (5) 0.5 to 2% based on the weight of said reaction product of a polydimethyl siloxane having a viscosity of about 50 to 500 centistokes at 25° C., curing the foam, and repeatedly passing said foam between squeeze rolls to wring said foam and rupture cell walls without tearing said foam.

17. The method of making a cellular, flexible polyurethane comprising reacting a polyalkylene ether glycol having a molecular weight of from 750 to 10,000, an organic polyisocyanate having from 2 to 3 isocyanato groups, the molar ratio of said glycol to said polyisocyanate being from 1:1.1 to 1:12, from 0.5 to 5% by weight of water based on the weight of said polyether glycol and said polyisocyanate, and from 0.5 to 6% by weight based on the weight of said polyether glycol and said polyisocyanate of an organic cross linking agent for the polyether-urethane foaming reaction having 3 to 14 carbon atoms and at least 3 and no more than 4 functional groups, said functional groups containing active hydrogen atoms and being selected from the group consisting of amino groups and

groups, in admixture with from 0.5 to 4% by weight based on the weight of said polyether glycol and said polyisocyanate of a catalyst for the polyether urethane foaming reaction, and a polydialkyl silicone oil to form a polyether urethane foam, curing said foam, and repeatedly passing said foam between squeeze rolls to wring said foam and rupture cell walls without tearing said foam, said polyalkylene ether glycol being reacted with said polyisocyanate to form a prepolymer, said cross linking compound being added to said prepolymer with said water and said catalyst.

References Cited in the file of this patent

UNITED STATES PATENTS

| | | |
|---|---|---|
| 2,850,464 | Mitchell | Sept. 2, 1958 |
| 2,866,774 | Price | Dec. 30, 1958 |
| 2,871,226 | McShane | Jan. 27, 1959 |
| 2,871,227 | Walter | Jan. 27, 1959 |
| 2,879,233 | Pace | Mar. 24, 1959 |
| 2,888,411 | Pace | May 26, 1959 |
| 2,901,445 | Harris | Aug. 25, 1959 |
| 2,915,496 | Swart et al. | Dec. 1, 1959 |
| 2,957,832 | Gmitter et al. | Oct. 25, 1960 |
| 2,977,330 | Brower | Mar. 28, 1961 |
| 2,993,013 | Wolfe | July 18, 1961 |

FOREIGN PATENTS

| | | |
|---|---|---|
| 205,456 | Australia | Jan. 4, 1957 |

OTHER REFERENCES

Wilson et al., 1,047,420, Dec. 24, 1958 (Auslegeschrift), H-3 1106 IVb-39b.